May 22, 1923.
J. W. LUSK
SHOCK ABSORBER
Filed April 5, 1922
1,455,920
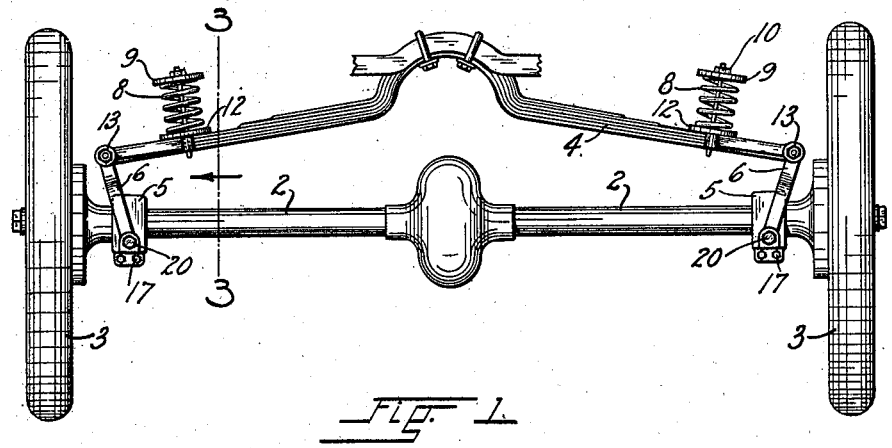
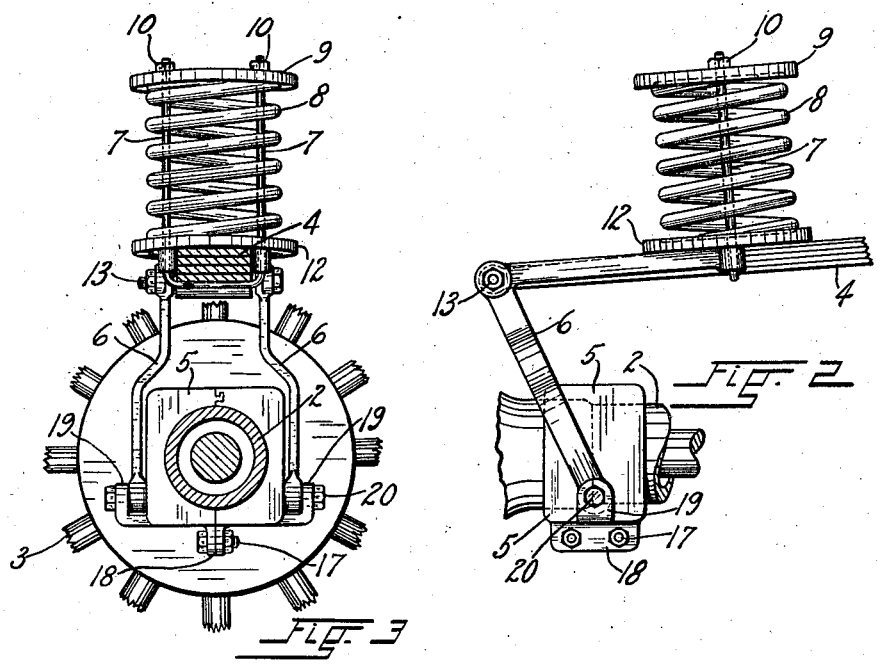
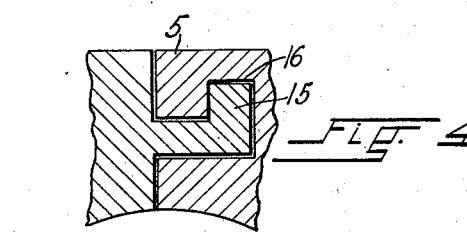
INVENTOR.
JOHN W. Lusk
BY
ATTORNEY.

Patented May 22, 1923.

1,455,920

UNITED STATES PATENT OFFICE.

JOHN W. LUSK, OF DENVER, COLORADO.

SHOCK ABSORBER.

Application filed April 5, 1922. Serial No. 549,810.

*To all whom it may concern:*

Be it known that I, JOHN W. LUSK, a citizen of the United States, residing at Denver, in the county of Denver and State of Colorado, have invented certain new and useful Improvements in Shock Absorbers, of which the following is a specification.

My invention relates to shock absorbers for motor vehicles and its primary object is to provide an appliance of simple construction which in its operative position, forms a resilient connection between an end of the cross spring of a motor vehicle and a relatively stationary support, such as the casing around the rear axle of the same.

It is another object of my invention to provide an appliance of the character mentioned which when applied at opposite ends of the cross spring of the vehicle, not only aids said spring in absorbing road shocks, but also equalizes the movement of the spring so as to maintain the vehicle body in a substantially level position, and furthermore cushions the rebound of the spring and thereby relieves the body of resultant concussions and vibration.

With the above and other objects in view my invention consists in the construction and arrangement of parts illustrated in the accompanying drawing in the various views of which like parts are similarly designated and in which—

Figure 1 represents an elevation of the rear wheels, axle casing and cross spring of a motor vehicle of the Ford type, showing my invention in its operative position with relation thereto;

Figure 2, an enlarged elevation of my improved shock absorber at corresponding ends of the spring and the axle-casing;

Figure 3, an enlarged section taken on the line 3—3, Figure 1; and

Figure 4, a further enlarged, fragmentary sectional view of the clamp-member of the appliance showing the joint between the two sections of which it is composed.

Referring in detail to the drawings, the reference character 2 designates the housing of the rear axle of a motor vehicle of the type above referred to, 3 the road wheels at opposite ends thereof, and 4 the superposed laminated cross-spring which ordinarily is connected at the ends of the housing through the intermediary of pivoted shackles.

My improved shock absorber comprises a clamping member 5 adapted to be rigidly secured around the axle housing, a pair of bell crank levers 6 which at the extremities of one of their arms, are pivotally connected to the clamping member, a U-bolt 7 connecting the ends of the other arms of the levers, a coiled spring 8 around the U-bolt, an abutment plate 9 held on the bolt in contact with the upper end of the spring by nuts 10 and a pressure plate 12 slidably mounted on the bolt in engagement with the opposite end of the spring.

To apply the shock absorber, the shackles which ordinarily connect the ends of the cross spring with the enlargements at the ends of the axle housing, are removed, the two bell crank levers are fulcrumed at the end of the spring by means of the shackle bolt 13, the clamp-member to which the levers are connected is fastened around the axle-housing, the U-bolt connecting the upper arms of the lever, is placed across the leaf spring so as to engage its lower surface and with its parallel members projecting upwardly at opposite sides of the spring, and the pressure plate upon which the coiled spring is supported, is disposed in engagement with the upper surface of the spring.

Two appliances thus arranged at opposite ends of the vehicle spring, conjointly provide a spring-suspension which when the road wheels of the vehicle strike obstructions on the surface over which they move, will aid the vehicle spring in absorbing the resultant shocks by compression of the auxiliary coiled springs 7, while they act in in a re-actionary capacity when the vehicle spring returns to its normal condition.

The two appliances at opposite ends of the vehicle spring, being capable of independent action, furthermore equalize the movements of the spring and thereby tend to maintain the vehicle body in a substantially level position.

It will be evident that in order to attain the above stated results, it is essential that the points of connection of the lower ends of the levers with the clamp members on the housing of the axle, are below the horizontal plane of the longitudinal axis of the axle, and that by this arrangement, a spring-support of the type to which my invention is particularly adapted, is modified to provide advantages possessed by the so-called underslung supports of bodies of more expensive cars.

The clamp-member by which the appliance is connected to the axle housing, is preferably composed of two complementary halves which are hollowed to conjointly fit around the housing.

The two sections of the clamp are joined together at one side of the housing by a hook shaped ledge 15 of one, co-operating with a correspondingly shaped recess 16 in the other, and they are connected at the opposite side of the housing by bolts 17 passed through alined apertures of contacting flanges 18.

The clamp has at opposite sides adjacent its lower edges, lugs 19 which are spaced from its sides to admit the ends of the lower arms of the levers which are pivotally secured by bolts 20 extending through apertures of the lugs into therewith axially alined threaded bores in the body of the clamp.

Having thus described my invention, what I claim and desire to secure by Letters Patent is:

1. In a vehicle, the combination with an axle, a housing and a spring for the support of the vehicle body, of an element including an abutment in superposed relation to the spring, a compression spring between the upper surface of the vehicle spring and the abutment, and a bell crank lever fulcrumed at an end of the vehicle spring, one arm of said lever being pivoted on the housing beneath the horizontal plane of the axis of the axle, and its other arm bearing against the lower end of the compression spring to contract the same by upward movement of the axle.

2. In a vehicle, the combination with an axle, a housing and a spring for the support of the vehicle body, of a U-bolt embracing the spring, an abutment on the bolt in superposed relation to the upper surface of the spring, a compression spring between the vehicle spring and the abutment, and a pair of bell crank levers fulcrumed at the end of the vehicle spring, corresponding arms of said levers being pivoted on the housing beneath the horizontal plane of the axis of the axle and the other arms being slidable on the U-bolt and bearing against the lower end of the compression spring to contract the same by upward movement of the axle.

3. In a vehicle, the combination with an axle, a therewith parallel cross-spring for the support of the vehicle body, and a housing, of elements including abutments in superposed relation to the spring at opposite ends thereof, compression springs between the vehicle spring and said abutments, and bell crank levers fulcrumed at the ends of the vehicle spring, one arm of each lever being pivoted to the housing beneath the horizontal plane of the axis of the axle, and their other arms bearing against the respective compression springs to contract the same by upward movement of the axle.

4. In a vehicle, the combination with an axle, a housing and a spring for the support of the vehicle body, of an element including an abutment in superposed relation to the spring, a compression spring between the upper surface of the vehicle spring and the abutment, and a lever fulcrumed at an end of the vehicle spring, one arm of said lever being pivoted on the housing beneath the horizontal plane of the axis of the axle, and its other arm bearing against the lower end of the compression spring to contract the same by upward movement of the axle.

In testimony whereof I have affixed my signature.

JOHN W. LUSK.